(12) United States Patent
Mochizuki

(10) Patent No.: US 6,384,926 B2
(45) Date of Patent: *May 7, 2002

(54) NETWORK SYSTEM HAVING PRINTERS, PRINTER FOR NETWORK SYSTEM, SERVER FOR NETWORK AND TERMINAL FOR NETWORK SYSTEM

(75) Inventor: Mamoru Mochizuki, Kawasaki (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/939,714

(22) Filed: Sep. 29, 1997

Related U.S. Application Data

(63) Continuation of application No. 08/451,776, filed on May 26, 1995, now abandoned.

(30) Foreign Application Priority Data

Sep. 20, 1994 (JP) .............................................. 6-225334

(51) Int. Cl.[7] .............................................. G06K 15/00
(52) U.S. Cl. ..................................... 358/1.15; 358/1.14
(58) Field of Search ................................. 395/101, 109, 395/112, 114, 375, 200.3, 200.31, 200.32, 200.33, 200.35, 200.49, 200.62, 827, 527; 358/501, 401, 403, 407, 408, 1.1, 1.9, 1.13, 1.15; 399/8, 46; 709/200, 201, 202, 203, 205, 219, 232; 710/7

(56) References Cited

U.S. PATENT DOCUMENTS

| | | | | |
|---|---|---|---|---|
| 5,220,674 A | * | 6/1993 | Morgan et al. | 395/200.53 |
| 5,323,393 A | * | 6/1994 | Barrett et al. | 370/85.8 |
| 5,421,012 A | * | 5/1995 | Khoyi et al. | 395/677 |
| 5,511,156 A | * | 4/1996 | Nagasaka | 345/433 |
| 5,534,974 A | * | 7/1996 | Hasegawa | 355/206 |
| 5,537,626 A | * | 7/1996 | Kraslavsky et al. | 395/828 |
| 5,548,728 A | * | 8/1996 | Danknick | 395/200.14 |
| 5,550,997 A | * | 8/1996 | Ip et al. | 395/430 |
| 5,577,172 A | * | 11/1996 | Vatland et al. | 395/114 |

FOREIGN PATENT DOCUMENTS

| | | |
|---|---|---|
| JP | 2-150377 | 8/1990 |
| JP | 5-81264 | 2/1993 |
| JP | 05-100804 | 4/1993 |
| JP | 5-289833 | 5/1993 |
| JP | 6-242901 | 2/1994 |

* cited by examiner

Primary Examiner—Gabriel Garcia
(74) Attorney, Agent, or Firm—Staas & Halsey LLP

(57) ABSTRACT

The present invention relates to a system which can gain a transmission access from a printer side to an upper equipment side, and also relates to a printer, a server and a terminal, each used for this system. In the system, the printer is connected to network via bi-directional communicable interface unit. This system is applicable to a network system including terminals, printers and servers via a network such as LAN.

12 Claims, 6 Drawing Sheets ized by the printer connected to the
NETWORK SYSTEM HAVING PRINTERS, PRINTER FOR NETWORK SYSTEM, SERVER FOR NETWORK AND TERMINAL FOR NETWORK SYSTEM This application is a continuation, of application Ser. No. 08,451,776, filed May 26, 1995, now abandoned.

BACKGROUND OF THE INVENTION

1) Field of the Invention

The present invention relates to a network system that is connected to terminals, printers, and servers via a network such as a LAN (local area network). The present invention also relates to a printer, a server, and a terminal, each used in the network system.

2) Description of the Related Art

Generally speaking, the network system such as a LAN includes plural terminals (clients) 31A and 31B such as personal computers (two in figure), as shown in FIG. 6. The print server (server) 32 accepts print requests from the terminals 31A and 31B and then operates the printer 33 to execute the print request.

Where the printer 33 is used as a remote printer in the network system shown in FIG. 6, it just receives print request data, but does not issue a process request to the upper equipment (e.g. print server 32 or terminals 31A and 31B).

Hence, normally, if trouble such as paper jamming or paper shortage occurs in the printer S3, the abnormal state is alarmed to a user by displaying on the operator panel equipped on the printer 33 or sounding a buzzer. However, with the printer 33 located remotely away from the terminals 31A and 31B, if nobody is around the printer 33, finding the abnormal state of the printer 33 will be late.

If a print request for a resource (e.g. character resource) not stored in the printer 33 has come while the printer 33 is printing, any access cannot be performed to ask the upper equipment for the resource, whereby such a printing operation becomes impossible.

SUMMARY OF THE INVENTION

The present invention is made to overcome the above mentioned problems. An object of the present invention is to provide a network system with a printer which can gain a transmission access from a printer side to an upper equipment side, thus providing an improved operability at a printing process and an effective printing work.

Another object of the present invention is to provide a printer used in a network system which can gain a transmission access from a printer side to an upper equipment side, thus providing an improved operability at a printing process and an effective printing work.

Still another object of the present invention is to provide a server used in a network system which can gain a transmission access from a printer side to an upper equipment side, thus providing an improved operability at a printing process and an effective printing work.

Further object of the present invention is to provide a terminal used for a network system which can gain a transmission access from a printer side to an upper equipment side, thus providing an improved operability at a printing process and an effective printing work.

In order to achieve the above objects, according to the present invention, the network system connected to a terminal, a printer, and a server via a network, the server operating the printer in response to a print request from the terminal, the printer executing a print request from the terminal, is characterized by the printer connected to the network via a bi-directional communicable interface unit.

According to the present invention, the printer used in a network system, the printer connected to a terminal and a server via a network to execute a print request from the terminal accepted by the server, the printer executing a print request from the terminal, is characterized by the printer connected to the network via a bi-directional communicable interface unit.

According to the present invention, the server used in a network system, the printer connected to a terminal and a printer via a network, the server operating the printer in response to a print request from the terminal so that the printer executes the print request from the terminal, is characterized by a control processing unit for executing a process corresponding to a process request in response to the process request from the printer.

According to the present invention, the terminal used for a network system, the terminal connected to a printer and a server via a network, the terminal issuing a print request to the server to request the printer for printing, is characterized by request issuing means for issuing and transmitting a print control information setting request or print operation status reference request to the printer as a process request.

As described above, according to the present invention, the printer can not only receive data from an upper equipment side (a terminal or a server), but also gain a transmission access to an upper equipment side. Hence the operability in a printing process can be largely improved and the printing work can be effectively realized.

Figure 1:
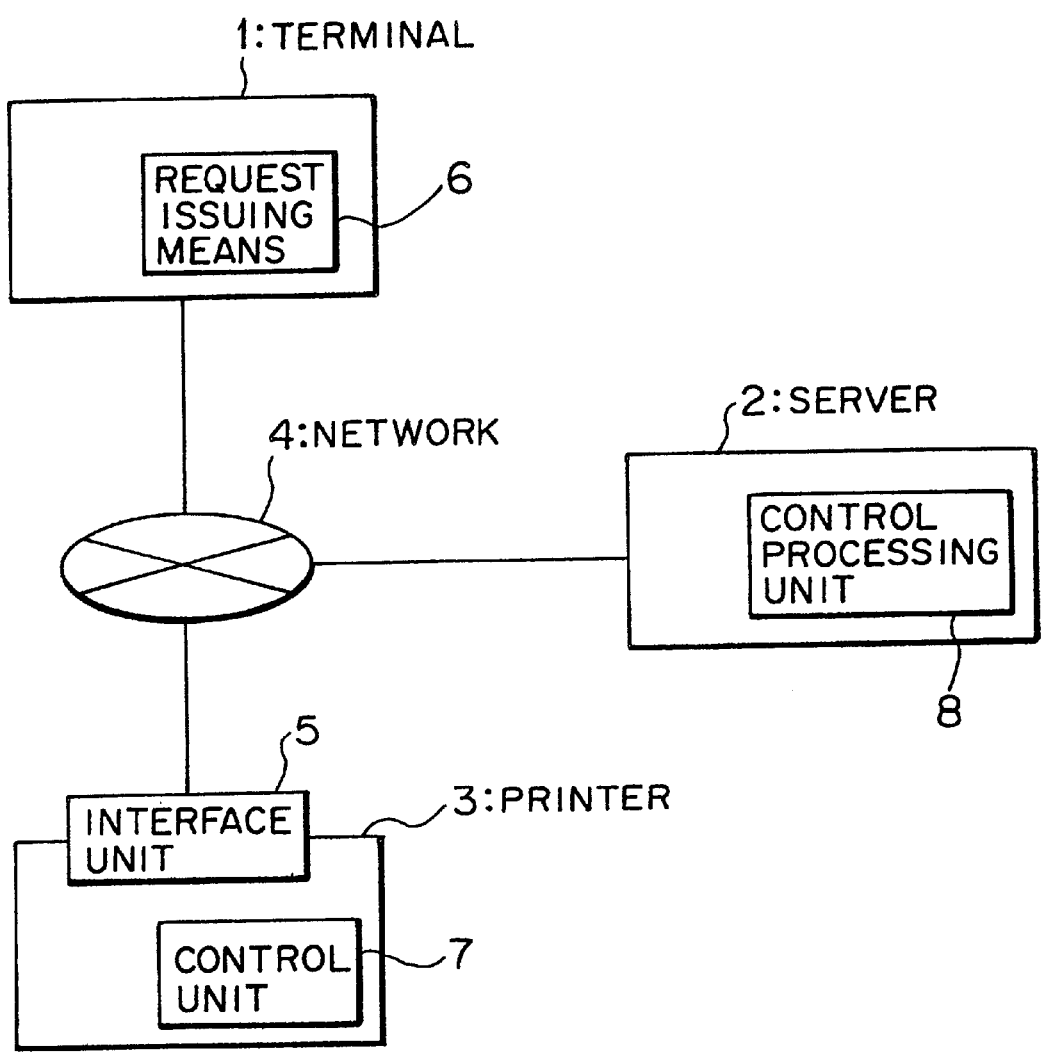
FIG. 1 is a block diagram showing an aspect of the present invention.

DESCRIPTION OF THE PREFERRED EMBODIMENTS (a) Aspect of the Invention:

FIG. 1 is a block diagram showing an aspect of the present invention. Referring to FIG. 1, numeral 1 represents a terminal, numeral 2 represents a server, and numeral 3 represents a printer. A network system is constructed by interconnecting the terminal 1, the server 2 and the printer 3 via the network 4. In the network system, the server 2 receives a print request from the terminal 1. If the server 2 accepts the print request, the server 2 operates the printer 3 to execute the print request from the terminal 1.

According to the present invention, the printer 3 is connected to the network 4 via the bi-directional communicable interface unit 5.

The terminal 1 includes request issuing means 6 that issues and transmits a print control information setting request or print operation status reference request as a process request to the printer 3. The printer 3 includes a control unit 7 that executes a process according to a process request from the terminal 1 received via the interface unit 5.

Where a process request from the terminal 1 is a print control information setting request, the control unit 7 in the printer 3 sets and changes the print control information in the printer 3 according to the print control information setting request. Where a process request from the terminal 1 is a print operation status reference request, the control unit 7 in the printer 3 transmits the operational status of the printer 3 via the interface unit 5, according to the print operation status reference request.

When a process request occurs to the server 2, the control unit 7 in the printer 3 transmits the process request to the server 2 via the interface unit 5. The server 2 includes a control processing unit 8 that executes a process according to a process request from the printer 3.

Where a process request from the printer 3 is a print operation status reporting request, the control processing unit 8 in the server 2 transmits the operational condition of the printer 3 to the terminal 1 according to the print operation status reporting request. Where the process request from the printer 3 is a resource request accompanying a printing operation, the control processing unit 8 in the server 2 transmits a necessary resource to the printer 3 according to the resource request.

In the network system according to the present invention shown in FIG. 1, since the printer 3 is connected to the network 4 via the bi-directional communicable interface unit 5, the printer 3 not only receives data from the upper apparatus (such as the terminal 1 or the server 2), but also gains a transmission access to the upper apparatus.

When the request issuing means 6 in the terminal 1 issues a process request to the printer 3 and the printer 3 receives a process request from the terminal 1 via the interface unit 5, the control unit 7 executes a process according to the process request.

Where a process request from the terminal 1 is a print control information setting request, the control unit 7 in the printer 3 sets and changes the print control information in the printer 3 according to the print control information setting request. Where the printer 3 is located remotely from the terminal 1, it is unnecessary to have an access to the installation of the printer 3 to change the setting state of the printer 3.

Where a process request from the terminal 1 is a print operation status reference request, the control unit 7 in the printer 3 transmits the operational condition of the printer 3 according to the print operation status reference request via the interface unit 5 and then the terminal 1 can refer to the operational status of the printer 3.

Furthermore, where there is a process request to the server 2, the control unit 7 in the printer 3 transmits it to the server 2 via the interface unit 5. In the server 2, the control processing unit 8 executes the process according to the process request.

Where the process request from the printer 3 is a print operation status reporting request, the control processing unit 8 in the server 2 transmits the operational condition of the printer 3 to the terminal 1 according to the print operation status reporting request. Thus the terminal 1 recognizes the operational condition.

Where a process request from the printer 3 is a resource request accompanying a printing operation, the control processing unit 8 in the server 2 transmits a necessary resource to the printer 3 according to the resource request. Where there is a print request of a resource not be held in the printer 3, the server 2 receives the resource so that the printing operation can be continued.

As described above, according to the present invention, the printer 3 not only receives data from the upper equipment (such as the terminal 1 or the server 2), but also can have a transmission access to the upper equipment side. As a result, this feature can largely improve the operability at the printing process and can realize the effective printing work.

In this case, since the terminal 1 issues a print control information setting request as a process request, the print control information in the printer 3 can be easily set and changed according to the print control information setting request without directly gaining access to the printer 3. Hence the operability can be largely improved in the printing operation.

Since the terminal 1 issues a print operation status reference request as a process request, the operational condition of the printer 3 is transmitted according to the print operation status reference request. Hence the terminal 1 can easily refer to the operational status of the printer 3, thus contributing to an further improvement of the operability in a printing process.

Since the printer 3 transmits a print operation status reporting request as a process request to the server 2, the operational status of the printer 3 can be transmitted to the terminal 1 according to the print operation status reporting request. Hence, if an abnormal state such as paper jamming and paper shortage occurs on the side of the printer 3, the fact can be informed immediately the terminal 1. Even if the printer 3 is installed remotely from the terminal 1, an abnormal state in the printer 3 is recognized immediately and is suitably dealt with. Thus the printing work can be effectively performed.

When a resource request as a process request is transmitted from the printer 3 to the server 2, a necessary resource can be sent back to the printer 3 according to the resource request. Hence even if a print request is made for a resource which is not stored in the printer 3, the server 2 receives the resource to continue the printing process. This procedure contributes further to an effective printing work.

(b) Embodiment:

An embodiment according to the present invention will be described below with reference to the attached drawings.

Figure 2:
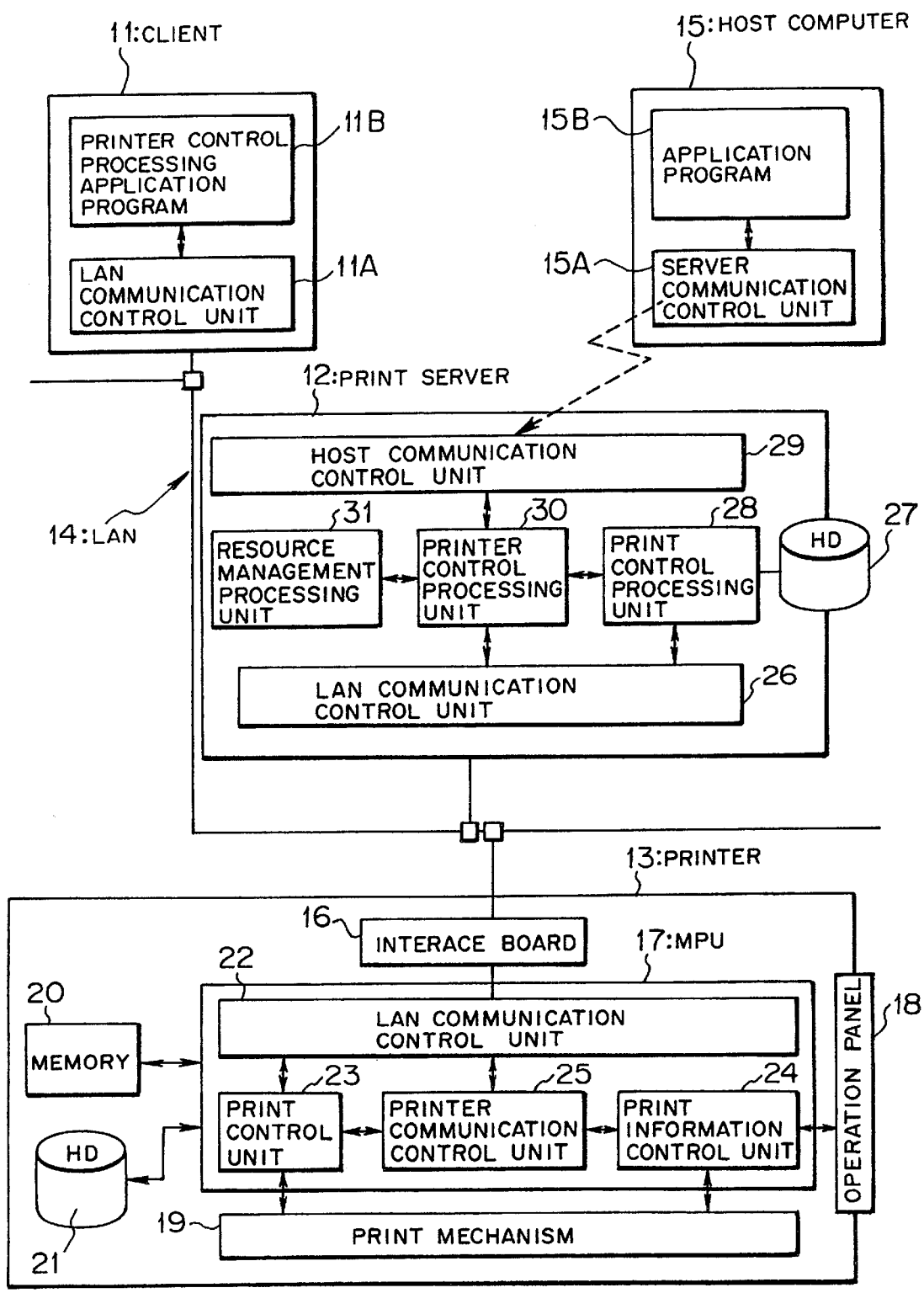
FIG. 2 is a block diagram showing a network system, a terminal constructing the network system, a server, and a printer each according to the first embodiment of the present embodiment.

FIG. 2 is a diagram showing a network system being an embodiment of the present invention, the network system including a terminal, a server, and a printer. Referring to FIG. 2, numeral 11 represents a client (terminal) such as a personal computer, and numeral 12 represents a print server (server unit), numeral 13 represents a printer (printer unit). A network system according to the present embodiment is formed by interconnecting the client 11, the print server 12, and the printer 13 via a LAN (network) 14. According to the present embodiment, the network system is configured using the network 14 including the network system OS and the LAN protocol generally used.

In such a network system, the print server 12 accepts a print request issued from the client 11 and then operates the printer 13. The printer 13 ezecutes the print request from the client 11.

In the embodiment, the host computer 15 connected communicably to the print server 12 is arranged as a client. The printer 13 executes a print request from the host computer 15. The host computer 15 consists of a server communication control unit 15A that controls a communication to the print server 12 and an application program 15B that executes a process in the host computer 15.

In the embodiment, the client 11 consists of a LAN communication control unit 11A that controls a communication to the LAN 14, a printer control process application program (request issuing means such as Windows) 11B that issues and transmits a print control information setting request or print operation status reference request as a process request to the printer 13. The print control information setting request requests the printer 13 to set and change, for example, paper size, print enlargement, print reduction, and the like. The print operation status reference request requests the printer 13 to transmit the status (status information), thus referring to the print operation status.

Conventionally the client 11 transmits a print request (print data stream) to the printer 13 via the LAN communication control unit 11A, the LAN 14, and the print server 12. The process request from the printer control process application program 11B is transmitted to the printer 13 via the LAN communication control unit 11A, the LAN 14, and the print server 12.

According to the present embodiment, the printer 13 consists of an interface board 16, a MPU 17, an operation panel 18, a print mechanism 19, a memory 20, and a hard disk 21.

The memory 20 stores print control information (e.g. paper size designation, enlargement and reduction printing, device address, and device name) in the form of a control information table. The hard disk 21 stores various kinds of information needed for the process of the printer 13, and saves and stores, if necessary, the information table stored in the memory 20.

The operation panel 18 which sets various kinds of print control information (attributes) includes setting switches and a display unit that displays the setting condition and operational condition of the printer 13. The print mechanism 19 performs a printing process in response to a command from the MPU 17.

The interface board 16 acts as an interface unit which connects the printer 13 to the LAN 14 in a bi-directional communicable way.

The MPU 17 acts as the LAN communication control unit 22, the print control unit 23, the print information control unit 24, and the printer communication control unit 25.

The LAN communication control unit 22 controls the communication to the LAN 14 via the interface board 16. If data received via the interface board 16 relates to print data, it is transmitted to the print control unit 23. If the data received relates to a print control information setting request or a print operation status reference request, it is transmitted to the printer communication control unit 25.

When print data is received via the interface board 16 and the LAN communication control unit 22, the print control unit 23 controls the print mechanism 19 according to the print control information on the control information table stored in the memory 20 and the received print data to execute an actual printing process.

Where a process request (print control information setting request, print operation status reference request) from the client 11 is received via the interface unit 16 and the LAN communication control unit 22, both the print information control unit 24 and the printer communication control unit 25 act as a control unit which performs a process according to the process request.

The print information control unit 24 manages the operation panel 18, the print control unit 23, and the printer communication control unit 25. When the printer communication control unit 25 receives a print control information setting request, the content of the print control information setting request is set and stored into the control information table or the hard disk 21 and is informed the operation panel 18, the print mechanism 19, and the print control unit 23.

For example, the printer communication control unit 25 receives a print setting request in the size of A4 print paper, the print information control unit 24 controls the display unit of the operation panel 18 to display a message representing "A4 print" thereon. The printer communication control unit 25 also sets the A4 print information onto the control information table in the memory 20, and informs the print mechanism 19 and the print control unit 23 of performing A4 print. Print data received later is printed in consideration of the set print information (A4 print).

When the printer communication control unit 25 receives a print operation status reference request, the print information control unit 24 requests the printer communication control unit 25 to transmit the status information representing the current print operational status of the printer 13. The printer communication control unit 25 transmits the status information to the print server 12 via the LAN communication control unit 22, the interface board 16, and the LAN 14, and then requests the print server 12 to send a report request (print operation status report request) of the status information to the client 11.

Where an abnormal event such as paper cramming (paper jamming), paper shortage occurs in the printer 13, the print information control unit 24 displays the event on the display unit of the operation panel 18 or sounds a buzzer, in the conventional way. In the present embodiment, the print information control unit 24 requests the printer communication control unit 25 to transmit the event occurrence. The printer communication control unit 25 transmits the event occurrence as status information to the print server 12 via the LAN communication control unit 22, the interface board 16, and the LAN 14 to send the report request (print operation status report request) of the status information to the client 11.

Where a printing operation causes a print request regarding resources (character resource or the like) not held in the printer 13, the print control unit 23 transmits the resource request to the printer communication control unit 25. The printer communication control unit 25 transmits the resource request to the print server 12 via the LAN communication control unit 22, the interface board 16, and the LAN 14. Then the print server 12 performs a suitable process according to the resource request.

According to the present embodiment, the print server 12 consists of the LAN communication control unit 26, the hard disk unit 27, the print control processing unit 28, the host communication control unit 29, the printer control processing unit 30, and the resource management processing unit 31.

The LAN communication control unit 26 controls the communication to the LAN 14. The hard disk unit 27 stores various data needed for the process in print server 12 and spools print data from the client 11. The print control processing unit 28 manages the print request to the printer 13 sent from the client 11. The host communication control unit 29 controls communications to the host computer 15.

When being received a process request (a print operation status report request, a resource request with a print operation) from the printer 13, the printer control processing unit 30 and the resource management processing unit 31 act as a control processing unit that processes according to the print request.

The printer control processing unit 30 which adds a value to the existing print service function of the print server 12 mediates the print operation status report request (status display request) or resource request which is sent from the printer 13.

Where a host printing (a print request from the host computer 15) to be described later) is performed, the resource management processing unit 31 receives necessary resources (characters and overlay) for printing from the host computer 15 via the host communication control unit 29 and then manages them.

When receiving a print operation status report request from the printer 13, the printer control processing unit 30 transmits the print operation status (status information) to the client 11 via the LAN communication control unit 26 and the LAN 14 to request the client 11 to display the status information.

When receiving a resource request from the printer 13, the printer control processing unit 30 receives a necessary resource from the resource management processing unit 31 according to the response request and then transmits it to the printer 13 via the LAN communication control unit 26 and the LAN 14.

Figure 4:
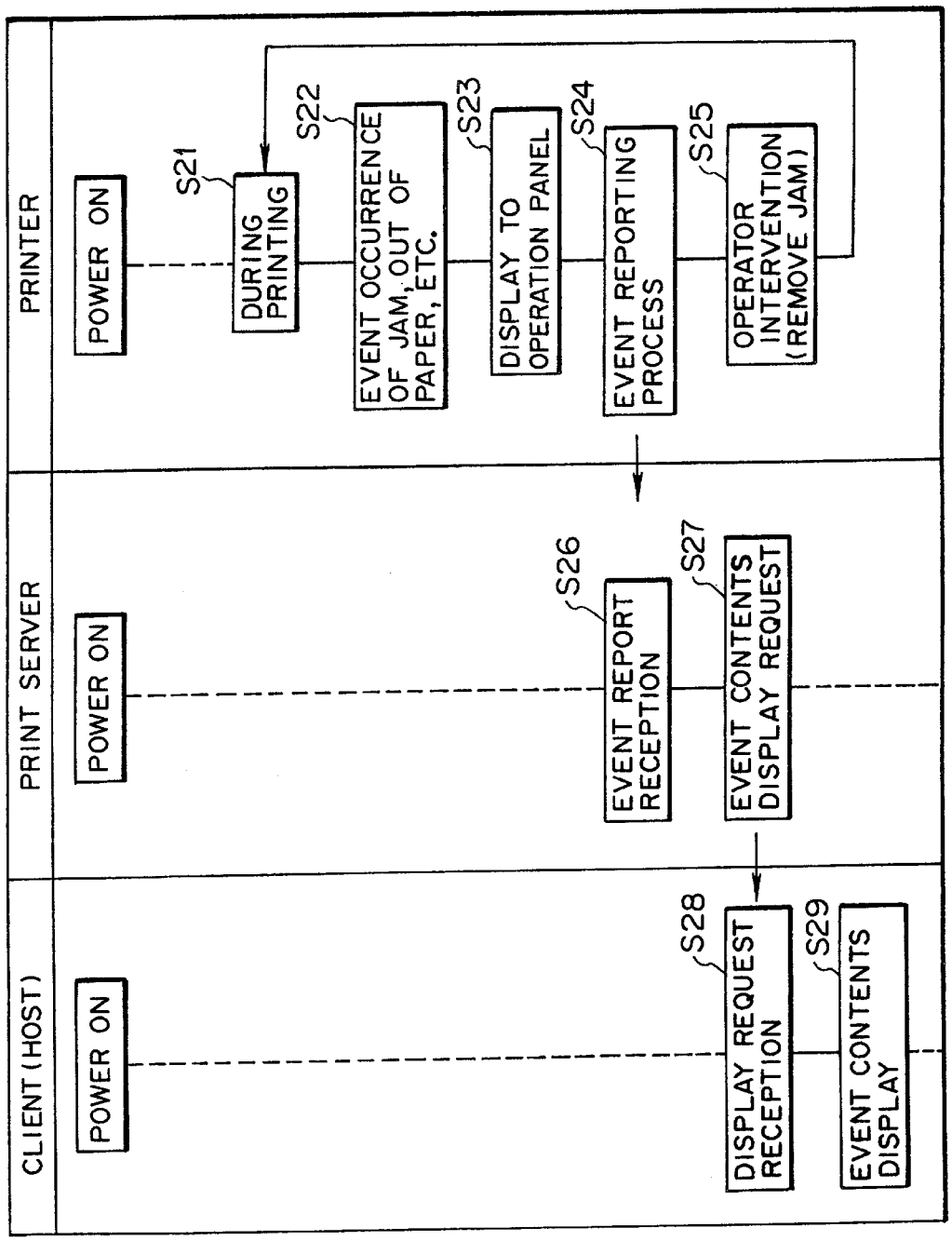
FIG. 4 is a flowchart used for explaining the operation (printer status report sequence) of the present embodiment.
Figure 5:
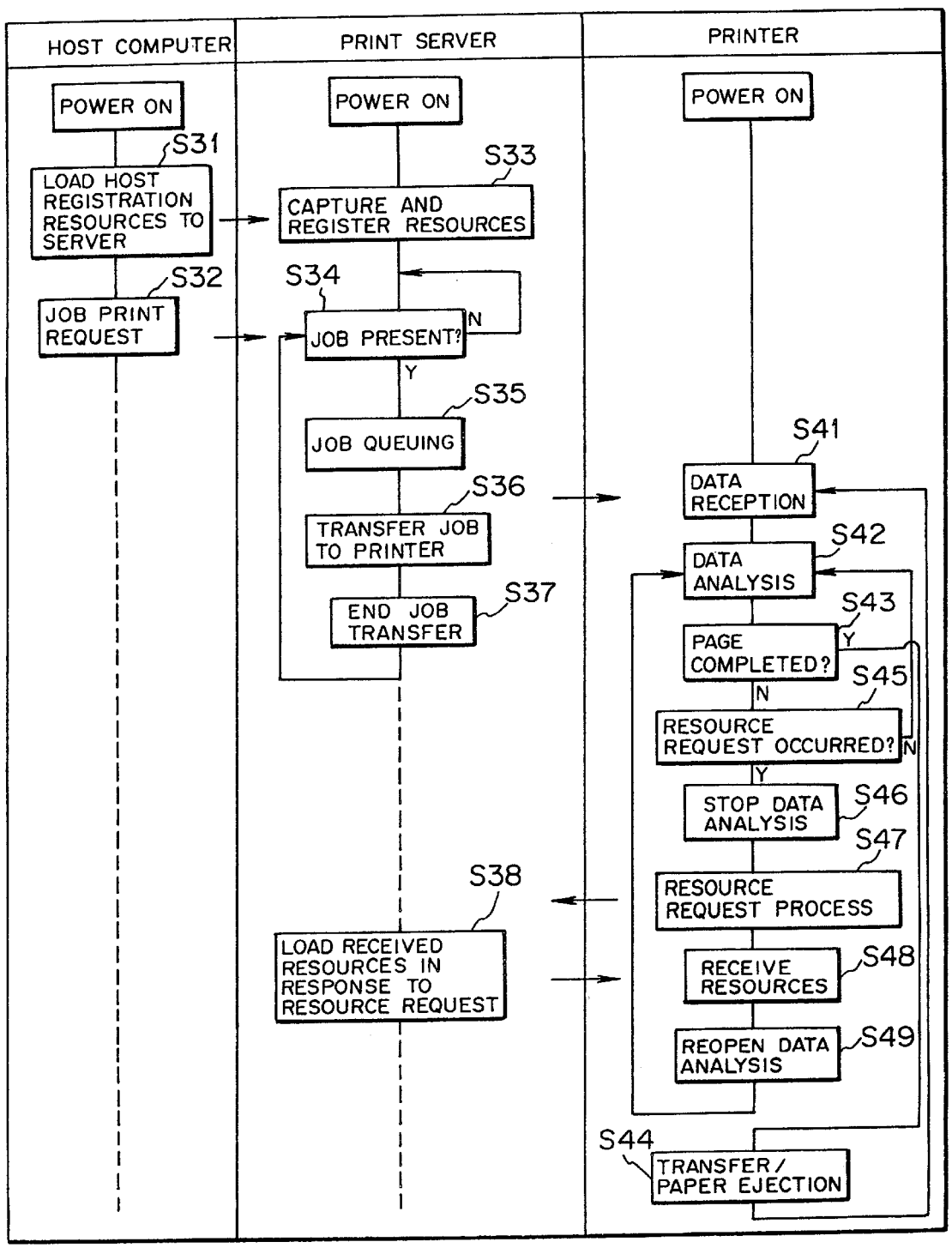
FIG. 5 is a flowchart used for explaining the operation (resource request sequence) of the present embodiment.
Figure 6:
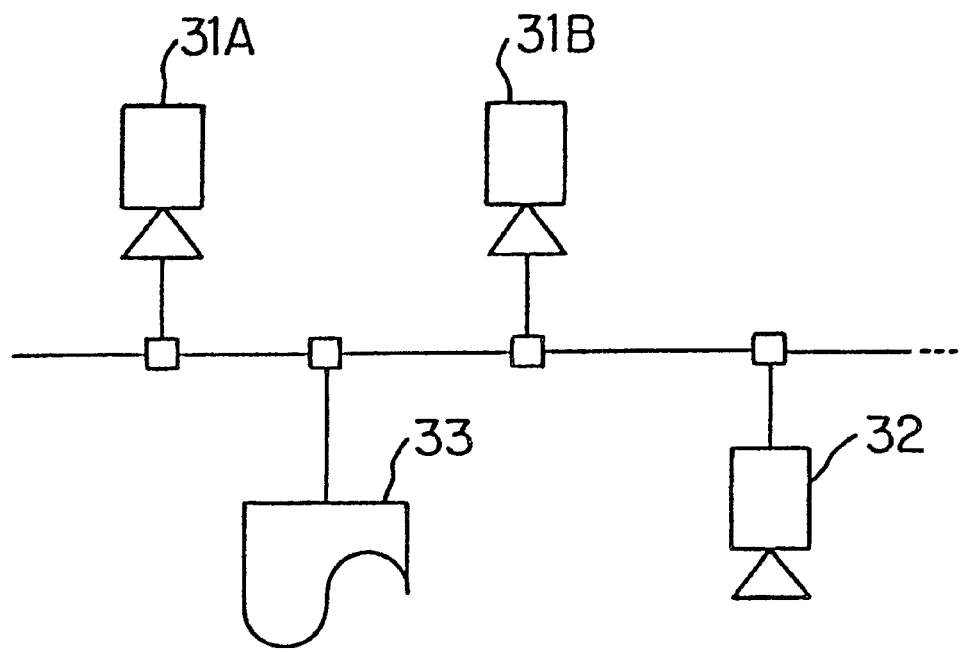
FIG. 6 is a block diagram showing a general network system having a printer.

Next, the operation of the configuration according to the present invention will be described below with reference to with the flowcharts showing FIGS. 3 to 5.

Figure 3:
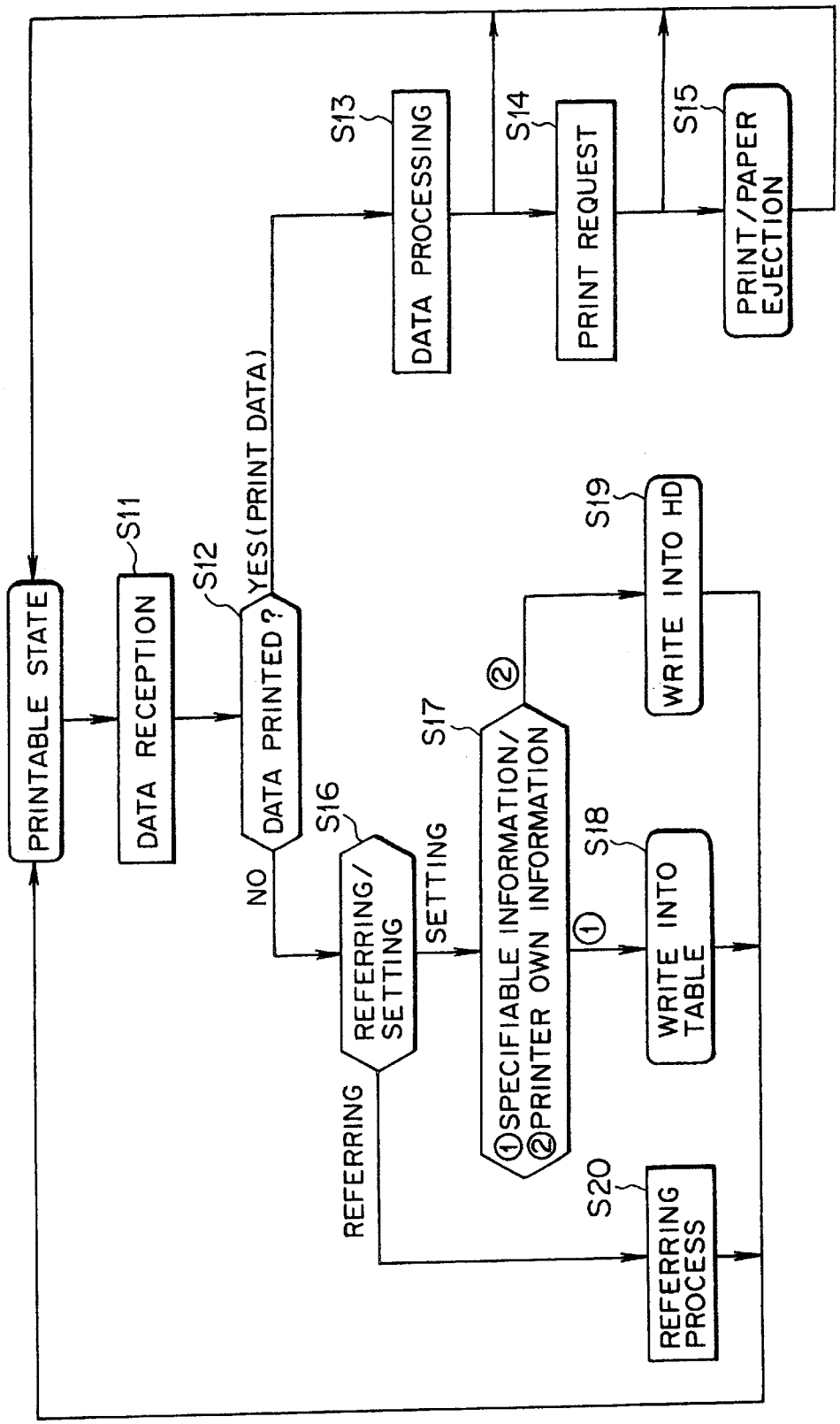
FIG. 3 is a flowchart used for explaining the normal operation of the printer according to the present embodiment.

FIG. 3 is used to explain the normal operation of the printer 13. As shown in FIG. 3, if the printer 13 is printable, the LAN communication control unit 22 decides whether the received data is print data or not (step S12) when the LAN communication control unit 22 receives data via the interface board 16 (step S11).

If the received data is print data, the print control unit 23 performs a predetermined data processing (e.g. expanding process) (step S13) and then requests the printer mechanism 19 to perform a printing operation (step S14). Then the print control unit 23 performs a printing operation according to the print control information in the control information table stored in the memory 20 and carries out paper feeding and ejection (step S15).

If the LAN communication control unit 22 receives data which is not print data, that is, a process request (print control information setting request or a print operation status reference request) from the client 11, the printer communication control unit 25 receives the process request to decide whether it is a print control information setting request or a print operation status reference request (step S16).

If the process request is a print control information setting request, it is decided whether the information to be set is specifiable information (e.g. paper size or enlargement/reduction print) in a print data stream or the information (e.g. device address or device name) regarding the printer 13 itself (step S17).

Where the information to be set is the specifiable information, the print information control unit 24 writes directly it into the control information table stored in the memory 20 (step S18) and then informs the operation panel 18, the printing mechanism 19, the print control unit 23 of the fact. On the other hand, if the information to be set is the information regarding the printer 13 itself, the print information control unit 24 writes directly it into the hard disk 21 (step S19).

The specifiable information is rewritten in real time on the control information table in the memory 20 during a printing operation and is not saved basically into the hard disk 21. However, the default is maintained and it is possible to save the information to the hard disk 21 by rewriting the default.

The information regarding the printer 13 itself is saved into the hard disk 21 at a setting operation and is enabled by booting the system at the next power-on time. The printer 13 moves various information saved into the hard disk 21 due to the power-on operation onto the control information table stored in the memory 20. Then the printer 13 uses the information on the control information table in the next printing process.

When it is decided that the process request is a print operation status reference request in the step S16, the print information control unit 24 refers to the current printing operation status of the printer 13 (step S20) and then requests the printer communication control unit 25 to transmit status information representing the print operation status.

The printer communication control unit 25 transmits the status information to the print server 12 via the interface board 16 and the LAN 14 to request the print server 12 to send it to the client 11.

The print server 12 which receives the print operation status report request operates in the same way as the steps S26 and S27 (to be described later with FIG. 4). The print operation status of the printer 13 is displayed on the client 11 (e.g. "under printing").

Therefore the client 11 refers to the status of the printer 13 by issuing a print operation status reference request to the printer 13 according to the printer control process application program 11B so that the condition of the printer 13 can be recognized at any time.

Next, the printer status report sequence according to the present embodiment will be described below with reference to FIG. 4.

After the client 11, the print server 12, and the printer 13 are energized, the network system starts up and then the printer 13 proceeds its printing operation (step S21). In this case, if an abnormal event such as paper jamming or paper shortage occurs in the printer 13 (step S22), the print information control unit 24 manifests the fact on the display unit of the operation panel 18 in the conventional way (step S23) (while a buzzer may be sounded).

According to the present embodiment, while the operation panel 18 performs a displaying process, the print information control unit 24 requests the printer communication control unit 25 to transmit the event occurrence. In response to the request, the printer communication control unit 25 transmits the event occurrence as status information to the print server 12 via the-LAN communication control unit 22, the interface board 16, and the LAN 14 and then requests the print server 12 to send a request of the status information to the client 11 (step S24). Thereafter, the printer 13 waits for an interruption by the operator (process like a removal from paper jamming) (step S25). Then the flow goes back to the printing process (step S21).

After the printer 13 performs the step S24, the print server 12 receives a print operation status report request (event report request) from the printer 13 (step S26). Thus the printer control processing unit 30 transmits the event content (status information) to the client 11 via the LAN communication control unit 26 and the LAN 14 and then requests the client 11 to display the event content (step S27).

When the client 11 receives the event display request from the print server 12 (step S28), the event content (e.g. "paper jamming", "papar shortage") is displayed (step S29).

Hence, even if the printer 13 is installed remotely from the client 11, the client 11 can recognize immediately an abnormal event occurring in the printer 13, thus can quickly deal with it.

Since many users (clients 11) usually use the printer 13 in the daytime, it is desirable to perform collectively the host printing that the host computer 15 performs a mass-printing using the printer 13, in the night time during which the printer 13 is used at low use frequency. Thus the printer 13 can be utilized effectively. The print server 12 has the existing print service function which processes plural jobs without disturbing the host operator. Hence the running cost can be reduced by performing the printing process using the existing print service function.

In the use of such a host printing operation, some jobs may use special resources such as characters personally registered by a user. The case (resource request sequence) where the printer 13 produces a resource request will be described below with reference to FIG. 5.

When the host computer 15, the print server 12, and the printer 13 are energized, the network system starts up. Thereafter, in order to perform a host printing operation, the server communication control unit 15A transmits and loads host registration resources from the host computer 15 to the print server 12 (step S31) and then sends a print request to the print rerver 12 (step S32).

When receiving host registration resources from the host computer 15 via the host communication control unit 29, the print server 12 captures it into the printer control processing unit 30. Then the resource management processing unit 31 registers and manages the host registration resources (step S33).

It is decided whether a job print request has been received or not from the host computer 15 (step S34). In response to the job print request, the job is queued (step S35). Then the print control processing unit 28 transmits the job to the printer 13 via the LAN communication control unit 26 and the LAN 14 (step S36). When the job has been transmitted (step S37), the flow goes back to the step S34 to wait for the next job print request.

When the printer 13 receives the job (print request data) from the print server 12 via the interface board 16 and the LAN communication control unit 22 (step S41), it sends the print request data to the print control unit 23. The print control unit 23 subjects the print request data to a data analysis (step S42) to expand data for one page. When data for one page has been expanded (YES decision in the step S43), the print mechanism unit 19 transfers to paper and then ejects the transferred paper (step S44).

If data for one page has not been expanded (NO decision in the step S43), the print control unit 23 decides whether a print request has occurred to resources not held in the printer 13 during the printing operation, or a resource request has been occurred (step S45).

If there is no resource request, the flow goes back to the data analysis in the step S42. If there is a resource request, the data analysis is stopped (step S46) to transmit the resource request from the print control unit 23 to the printer communication control unit 25. The printer communication control unit 25 transmits the resource request to the print server 12 via the LAN communication control unit 22, the interface board 16, the LAN 14 to request the print server 12 of resources (step S47).

The print server 12 which has received the resource request receives necessary resources from the resource management processing unit 31 according to the resource request. The printer control processing unit transmits and loads the necessary resources to the printer 13 via the LAN communication control unit 26 and the LAN 14 (step S38).

When the printer 13 receives the requested resources via the interface board 16 and the LAN communication control unit 22 (step S48.), the print control unit 23 reopens the data analysis (step S49). Then the flow goes back to the step S42.

According to the present embodiment, where a resource request occurs during the printing operation of the printer 13 (print control unit 23), the printer 13 can inform the printer server 12 of the resource request. Moreover, the print server 12 which has received the report can load the necessary resource to the printer 13 so that the host printing which requires special resources can be performed. Thus an extra value can be added to the existing print service.

As described above, according to the present embodiment, the client 11 issues a print control information setting request so that the print control information can be easily set and varied according to the print control information setting request without going to the printer 13. Hence the operability in the printing process can be largely improved.

Issuing a print operation status reference request from the client 11 enables transmitting the operational status of the printer 13 from the printer 13 to the client 11. Hence the client 11 can easily refer to the operational status of the printer 13, thus improving further the operability in the printing operation.

Moreover, the printer 13 can transmit its operational status to the client 11 by transmitting a print operation status report request from the printer 13 to the print server 12. Hence, if an abnormal state occurs in the printer 13, the fact can be immediately informed the client 11. Even if the printer 13 is installed remotely from the client 11, the fault printer 13 can be quickly recognized. The above-mentioned feature can deal suitably with the abnormal state and contribute largely to the effective printing work.

Moreover, the print server 12 returns a necessary resource to the printer 13 in response to a resource request transmitted from the printer 13 to the print server 12. Hence, even if a print request not held in the printer 13 occurs, the printing process can continue by receiving it by the print server 12. This feature further improves the efficiency of the printing work.

What is claimed is:

1. A printer to perform printing for a network printing system of a network communicatively connecting said printer, a terminal, a server and a host computer, said printer being operable to recieve a print job from said host computer via the server and the network, and a first print process request, transmitted from the terminal as one of a print control information setting request for requesting said printer to change a configuration of said printer, and a print operation status reference request for requesting said printer to notify the terminal of printing status at said printer, said printer comprising:

an interface unit to bi-directional interface with the network;

a print processing control unit, communicatively connected with said interface unit, to perform printing responsive to the first print process request, transmitted from the terminal and the print job transmitted from said host computer; and a process request server transmission control unit, communicatively connected with said interface unit, to transmit to the server via said interface unit, a second print process request which is one of a print operation status report request for requesting the server to notify the terminal of current status of said printer, and a resource request for requesting the server to supply a necessary resource which has been downloaded from the host computer to the server.

2. The printer according to claim 1, wherein if said first print process request from the terminal is a print control information setting request, said print processing control unit of said printer sets and varies print control information in said printer according to said print control information setting request.

3. The printer according to claim 1, wherein if said first print process request from the terminal is a print operation status reference request, said print processing control unit of said printer transmits information on the operational status of said printer to the server via said interface unit according to said print operation status relerence request.

4. A server managing network printing for a network printing system via a network which communicatively connects each of said server, a terminal, a printer and a host computer, said server being operable to recieve a second print process request, which is one of a print operation status report request, for requesting the server to notify the terminal of a current status of the printer, and a resource request for requesting said server to supply a necessary resource to the printer, said server comprimising:

a host communication control unit to control communication between the host computer and said server;

a print process request intermediate control unit to manage a first print process request transmitted from the terminal and which is one of a print control information setting request for requesting the printer to change a configuration thereof, and a print operation status reference request for requesting the printer to notify the terminal of printing status at the printer and to transfer a print job, from the host computer, to the printer; and a control processing unit to notify a current status of the printer to the terminal in response to the print operation status report request from the printer to supply the necessary move, which has been downloaded from the host computer to said server, in response to the resource request from the printer.

5. The server according to claim 4, wherein said second print process request from the printer is said print operational status report request, said control processing unit of said server transmits information on the operational status of the printer to the terminal in response to said print operation status report request.

6. The server according to claim 4, wherein if said second print process request from the printer is said resource request, said control processing unit transmits a necessary resource for a print operation to the printer in response to said resource request to the printer, according to said resource request.

7. A network printing system for carrying out network printing via a network, comprimising:

a printer, communicably connected with the network, to perform printing operations;

a server, communicably connected with the network, to mangae said network printing system, a host computer, communicably connected with the network, to supply a necessary resource to said server and to transmit a print job to said printer via said server and the network; and a terminal, a communcably connected with the network, to request said printer to print; said terminal including a print process request transmission unit to transmit a first print process request, which is one of a print control information setting request for requesting said printer to change a configuration thereof, and a print operation status reference request for requesting said printer to notify said terminal of printing status at said printer, said printer including, a print processing control unit to control the printing operations in response to the first print process request transmitted from said terminal and the print job transmitted from said host computer, and a process request server transmission control unit to transmit a second print process request, which is one of a print operation status report request for requesting said server to notify said terminal of a current status of said printer, and a resource request for requesting said server to supply the necessary resource to said printer, and said server including a print process request intermediate control unit to manage the first print process request transmitted from said terminal to said printer and to transfer the print job, from the host computer, to said printer, and a control processing unit to notify said terminal of the current status of said printer in response to the print operation status report request from said printer, and to supply to said printer the necessary resource, which has been downloaded from said host computer, in response to the resorce request from said printer.

8. The network system according to claim 7, wherein said print process request transmission unit of said terminal comprises:

a request issuing unit for issuing and transmitting as said first process request a print control information setting request or a print operation status reference request to said printer.

9. The network system according to claim 7, wherein if said first print process request from said terminal is a print control information setting request, said print process control unit of said printer sets and changes print control information in said printer according to said print control information setting information.

10. The network system according to claim 7, wherein if said second print process request from said terminal is a print operation status reference request, said print processing control unit of said printer transmits information on the operation status of said printer to said server via said interface unit according to said print operation status reference request.

11. The network system according to claim 7, wherein if said second print process request from said printer is said print operation status report request, said control processing unit of said server transmits information on the operational status of said printer to said terminal in response to said print operation status report request.

12. The network system according to claim 7, wherein if said second print process request from said printer is said resource request, said control processing unit of said server tranmits a necessary resource for a print operation to said printer in response to said resource request.

* * * * *

UNITED STATES PATENT AND TRADEMARK OFFICE
CERTIFICATE OF CORRECTION

PATENT NO.    : 6,384,926 B2
DATED         : May 7, 2002
INVENTOR(S)   : Mamoru Mochizuki It is certified that error appears in the above-identified patent and that said Letters Patent is hereby corrected as shown below:

Column 10,
Line 44, change "receive" to -- receive --.

Column 11,
Line 21, change "comprimising" to -- comprising --;
Line 34, after "printer" insert -- , and --;
Line 35, change "move" to -- resource --;
Line 38, after "wherein" insert -- if --;
Line 52, change "comprimising" to -- comprising --; and
Line 61, change "a communcably" to -- communicably --.

Column 12,
Line 29, change "resorce" to -- resource --; and
Line 61, change "tranmits" to -- transmits --.

Signed and Sealed this

Eighteenth Day of June, 2002

*Attest:*

JAMES E. ROGAN
*Attesting Officer*          *Director of the United States Patent and Trademark Office*